(12) United States Patent
Lee

(10) Patent No.: US 12,728,817 B2
(45) Date of Patent: Sep. 8, 2026

(54) VEHICLE SMART KEY SYSTEMS AND METHODS

(71) Applicant: Toyota Motor Engineering & Manufacturing North America, Inc., Plano, TX (US)

(72) Inventor: Jieun Lee, Ann Arbor, MI (US)

(73) Assignees: TOYOTA MOTOR ENGINEERING & MANUFACTURING NORTH AMERICA, INC., Plano, TX (US); TOYOTA JIDOSHA KABUSHIKI KAISHA (JP)

( * ) Notice: Subject to any disclaimer, the term of this patent is extended or adjusted under 35 U.S.C. 154(b) by 22 days.

(21) Appl. No.: 18/608,775

(22) Filed: Mar. 18, 2024

(65) Prior Publication Data

US 2025/0289396 A1 Sep. 18, 2025

(51) Int. Cl.

| | |
|---|---|
| ***B60R 25/25*** | (2013.01) |
| ***B60Q 3/80*** | (2017.01) |
| ***B60R 25/01*** | (2013.01) |
| ***B60R 25/33*** | (2013.01) |

(52) U.S. Cl.

CPC ................ *B60R 25/25* (2013.01); *B60Q 3/80* (2017.02); *B60R 25/01* (2013.01); *B60R 25/33* (2013.01); *B60R 2325/20* (2013.01)

(58) Field of Classification Search

None

See application file for complete search history.

(56) References Cited

U.S. PATENT DOCUMENTS

| | | | | |
|---|---|---|---|---|
| 7,877,275 | B2 * | 1/2011 | Ball | A61B 5/0022 600/300 |
| 9,758,116 | B2 * | 9/2017 | Xiong | B60R 16/037 |
| 9,886,805 | B1 * | 2/2018 | Bianchi, III | G07C 9/00309 |
| 10,146,196 | B2 * | 12/2018 | Medelius | G05B 15/02 |
| 11,465,587 | B2 * | 10/2022 | Moeller | G07C 9/00182 |
| 2003/0151516 | A1 * | 8/2003 | Basir | G08B 21/06 600/300 |
| 2007/0013531 | A1 * | 1/2007 | Hules | B60R 25/1004 340/584 |

(Continued)

FOREIGN PATENT DOCUMENTS

| | | | | |
|---|---|---|---|---|
| CN | 115303217 A | * 11/2022 | | B60R 16/023 |
| JP | 2006298014 A | * 11/2006 | | |

(Continued)

*Primary Examiner* — Kevin R Steckbauer

(74) *Attorney, Agent, or Firm* — Snell & Wilmer LLP

(57) ABSTRACT

Methods, systems, and apparatus for a vehicle preconditioning system. The vehicle preconditioning system includes a vehicle and an associated wireless key for the vehicle. The wireless key is configured to measure biometric data (e.g., heart rate, temperature, and the like) of a user of the wireless key to determine a physiological state of the user. The wireless key can transmit a signal including the biometric data of the user to the vehicle. The vehicle can receive the signal and precondition the vehicle based upon the signal. Preconditioning can include adjusting climate control settings, lighting settings, and/or audio settings, among other settings. The wireless key can transmit location data of the wireless key, which can be used to precondition the vehicle (e.g., to detect the wireless key is approaching or to determine a current activity of the user).

20 Claims, 8 Drawing Sheets

(56) References Cited

U.S. PATENT DOCUMENTS

2008/0016002 A1* 1/2008 Beenau ................ G06Q 20/327 340/5.82
2008/0117079 A1* 5/2008 Hassan ................. F02N 11/101 340/901
2010/0052931 A1* 3/2010 Kolpasky ................ B60R 25/00 340/670
2011/0187498 A1* 8/2011 Flaherty ................... G08B 6/00 340/5.72
2014/0275834 A1* 9/2014 Bennett ................ A61B 5/0205 600/300
2015/0116078 A1* 4/2015 Mishra ................... G07C 9/257 340/5.51
2015/0116079 A1* 4/2015 Mishra ................... G07C 9/257 340/5.52
2015/0120151 A1* 4/2015 Akay ...................... B60R 25/01 701/1
2015/0201846 A1* 7/2015 Maiershon ............. G16H 40/67 600/301
2017/0282856 A1* 10/2017 Riedel ..................... B60R 25/24
2018/0018179 A1* 1/2018 Scheufler .............. H04L 67/306
2019/0077279 A1* 3/2019 Malcolm .............. B60N 2/0252
2020/0216094 A1* 7/2020 Zhu ....................... B60W 40/09
2023/0281949 A1* 9/2023 Ghannam ............ G06V 10/443 382/115
2024/0140167 A1* 5/2024 Ng ....................... B60H 1/0075
2025/0289396 A1* 9/2025 Lee .......................... B60Q 3/80

FOREIGN PATENT DOCUMENTS

JP 4038551 B1 * 1/2008
JP 2008189261 A * 8/2008
KR 20100088515 A * 8/2010 ............... A61B 5/02
KR 101281807 B1 * 7/2013 ............. B60R 25/25
WO WO-2016126763 A1 * 8/2016 ............. B60R 25/24

* cited by examiner

VEHICLE SMART KEY SYSTEMS AND METHODS

BACKGROUND

Field

This disclosure relates generally to vehicle smart key systems and methods and in particular, but not exclusively, to key fobs controlling vehicle systems with user biometric data.

Description of the Related Art

Oftentimes, vehicles utilize remote keyless entry systems to enable a user (e.g., a driver) to unlock and/or open a door without inserting a key into a lock. Some remote keyless entry systems include a key fob that is carried by the user. The key fob has a wireless transducer that communicates with a vehicle to initiate the unlocking and/or opening of the door. Other remote keyless entry systems utilize an application operating on a mobile device (e.g., a smart phone) that communicates with the vehicle to unlock and/or open the door.

When the driver enters the vehicle, the driver can manually adjust vehicle settings (e.g., climate control, seat position, lighting, etc.) to the driver's liking. This process takes time and can distract the driver from other important tasks such as maintaining an awareness of vehicle surroundings. Accordingly, there is a need for a system and method for preconditioning a vehicle according to the driver's real-time preferences.

SUMMARY

In general, one aspect of the subject matter described in this disclosure may be embodied in a system including a wireless key and a vehicle. The wireless key can be configured to determine a location of the wireless key and/or a biometric data of a user of the wireless key. The wireless key can be configured to transmit a signal including the at least one of the location of the wireless key and/or the biometric data of the user of the wireless key. The vehicle can be configured to receive the signal from the wireless key and precondition the vehicle based upon the signal.

These and other embodiments may optionally include one or more of the following features. The wireless key includes a biometric sensor configured to measure the biometric data of the user. The biometric data can include a heart rate of the user and/or a temperature of the user. The preconditioning of the vehicle based upon the signal can include adjusting an interior lighting of the vehicle, a climate control of the vehicle, and/or an audio setting of the vehicle. Adjusting the interior lighting of the vehicle can include adjusting a color of the interior lighting. The wireless key can further include a GPS whereby the wireless key is configured to determine the location of the wireless key. The wireless key can further include a gyro sensor whereby the wireless key is configured to determine a movement of the user. The wireless key can further include a precondition button. The wireless key can be configured to transmit the signal in response to the user engaging the precondition button. The signal can include the location of the wireless key. The vehicle can be further configured to determine that the wireless key is approaching the vehicle and, in response to determining the wireless key is approaching the vehicle, precondition the vehicle.

In another aspect, a vehicle is provided. The vehicle can include a communication module and a vehicle preconditioner. The communication module can be configured to broadcast a beacon to prompt a wireless key to send a signal, and receive the signal from the wireless key that includes biometric data of a user of the wireless key. The vehicle preconditioner can be configured to determine a desirable vehicle condition based on the biometric data and precondition the vehicle to the desirable vehicle condition.

These and other embodiments may optionally include one or more of the following features. The desired vehicle condition can be a climate control setting, a lighting setting, and/or an audio setting. The biometric data can include a heart rate of the user and/or a temperature of the user. The vehicle preconditioner can be further configured to determine whether the wireless key is inside of a preconditioning zone of the vehicle. The operation of preconditioning the vehicle to the desired vehicle condition can be performed in response to the vehicle preconditioner determining that the wireless key is inside of the preconditioning zone of the vehicle.

In another aspect, a method is provided. The method includes receiving, via a communication module of a vehicle, a signal from a wireless key that includes biometric data of a user of the wireless key, and preconditioning the vehicle based upon the biometric data of the user.

These and other embodiments may optionally include one or more of the following features. The method can further include measuring, with a biometric sensor of the wireless key, a physiological state of the user, wherein the physiological state of the user is included in the biometric data. The preconditioning the vehicle can include adjusting an interior lighting of the vehicle, adjusting an interior cabin temperature of the vehicle, and/or adjusting an audio setting of the vehicle. The physiological state of the user can include a heart rate of the user and/or a body temperature of the user. The method can further include detecting, with a GPS of the wireless key, a location of the user, and the preconditioning the vehicle based upon the biometric data of the user is further based upon the location of the user.

BRIEF DESCRIPTION OF THE DRAWINGS

Other systems, methods, features, and advantages of the present invention will be apparent to one skilled in the art upon examination of the following figures and detailed description. Component parts shown in the drawings are not necessarily to scale, and may be exaggerated to better illustrate the important features of the present invention.

DETAILED DESCRIPTION

Disclosed herein are systems, apparatuses, vehicles, and methods for improving user experience when entering and operating a vehicle. Particular embodiments of the subject matter described in this disclosure may be implemented to realize one or more of the following advantages. A wireless key system utilizes biometric sensors, and/or other sensors, to gather information about a user's physiological state. The vehicle uses this information to precondition the vehicle in real-time based on the user's physiological feedback. In this manner, the system provides a user-centered cabin experience in real-time based on the user's physiological feedback.

The vehicle can adapt to different environmental factors and/or physiological states of the user. The wireless key can utilize a Global Positioning System (GPS) unit for detecting location data including a current location of the wireless key to determine the location of the user. The location of the user can indicate to the system a physiological state of the user (e.g., the system can assume the user's heartbeat is elevated when the user is at the gym) and/or can indicate to the system a time of arrival of the user to the vehicle (e.g., the system can determine the user is approaching the vehicle, or about to approach the vehicle, using GPS data). The wireless key can utilize one or more biometric sensors to detect the physiological state of the user (e.g., heart rate and/or body temperature). The system can adjust climate control settings (and/or other vehicle settings) based upon the user's physiological state. In this manner, the wireless key can be linked to the vehicle to send the driver's information when the driver is not in the vehicle. The vehicle can intelligently provide vehicle comfort and adjust dynamic vehicle settings based on data extrapolated from the wireless key.

Other benefits and advantages include the use of artificial intelligence including machine algorithm learning with models to anticipate, predict, or otherwise determine when a user's desired settings based on user physiological data. By anticipating, predicting or otherwise determining the user's desired vehicle settings when the user is under different physiological states, the system can proactively anticipate the desired vehicle settings for different user data and may act to precondition the vehicle accordingly.

Figure 1:
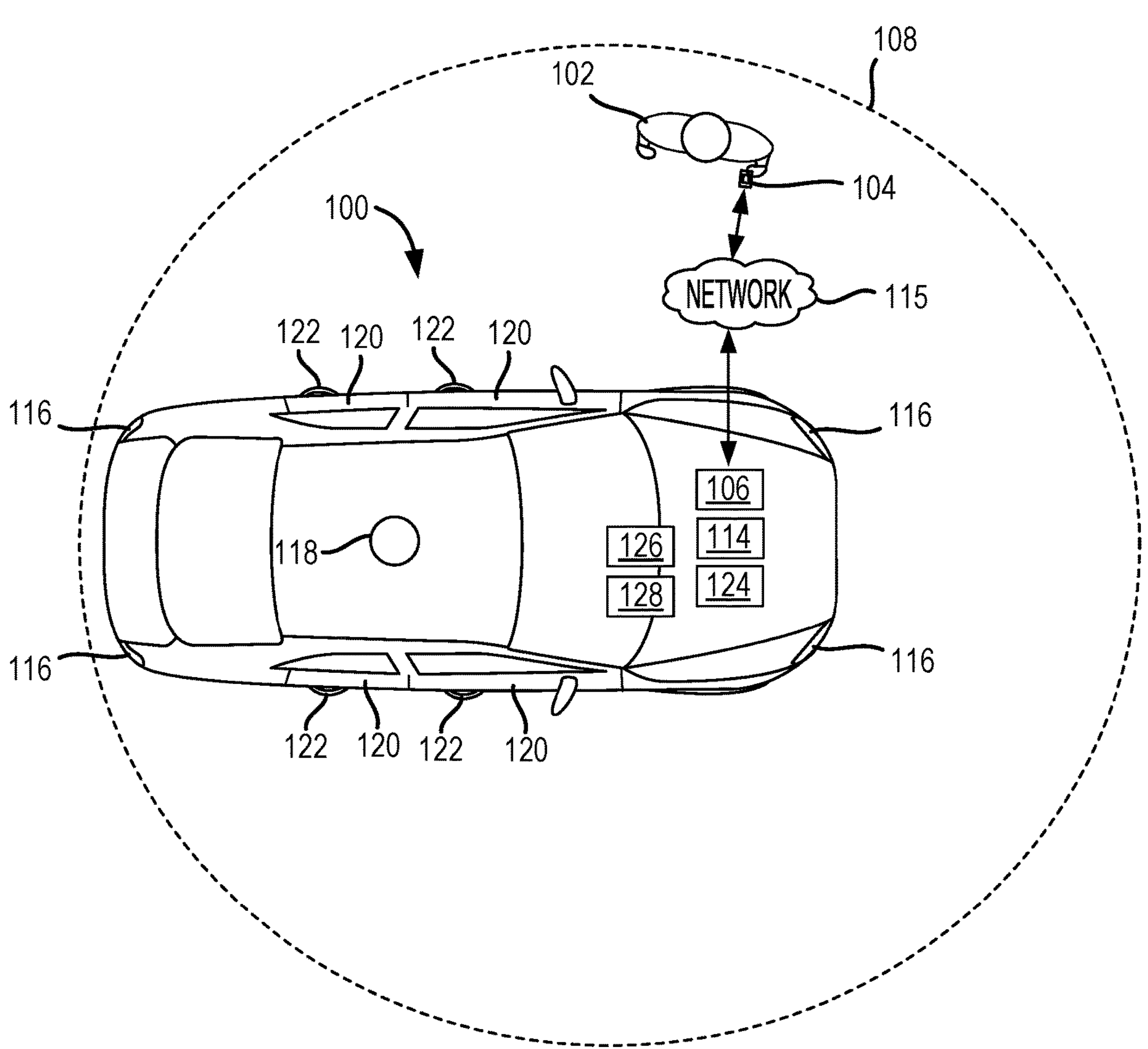
FIG. 1 illustrates an example vehicle and an example wireless key according to an aspect of the invention.

Turning to the figures, FIG. 1 illustrates an example vehicle 100 and a user 102 carrying an example wireless key 104 in accordance with the teachings herein. The vehicle 100 may be a standard gasoline powered vehicle, a hybrid vehicle, an electric vehicle, a fuel cell vehicle, and/or any other mobility implement type of vehicle. The vehicle 100 includes parts related to mobility, such as a powertrain with an engine, a transmission, a suspension, a driveshaft, and/or wheels, etc. The vehicle 100 may be non-autonomous, semi-autonomous (e.g., some routine motive functions controlled by the vehicle 100), or autonomous (e.g., motive functions are controlled by the vehicle 100 without direct driver input).

In the illustrated example, the vehicle 100 includes a communication module 106 that is to communicatively couple to the wireless key 104. The communication module 106 can be a short-range wireless module that includes a wireless transducer to wirelessly communicate with the wireless key 104 and/or another device that is within a broadcast range or distance of the communication module 106. The short-range wireless module includes software, hardware and firmware to establish a connection with the wireless key 104. In some examples, the short-range wireless module implements the Bluetooth® and/or Bluetooth® Low Energy (BLE) protocols. The Bluetooth® and BLE protocols are set forth in Volume 6 of the Bluetooth® Specification 4.0 (and subsequent revisions) maintained by the Bluetooth® Special Interest Group. The short-range wireless module can implement Wi-Fi, NearLink, near-field communication (NFC), LPWAN, ultra-wideband (UWB) and/or IEEE 802.15.4. In various examples, the vehicle 100 includes one communication module (e.g., the communication module 106). In other examples, the vehicle 100 includes a plurality of communication modules that are to communication with the wireless key 104 and are positioned at different locations throughout the vehicle 100.

As illustrated in FIG. 1, the broadcast range of the communication module 106 can define a proximity range 108 of the vehicle 100 in which the communication module 106 is capable of communicating with the wireless key 104 and/or another device. For example, when the wireless key 104 is within the proximity range 108 of the vehicle 100, the wireless key 104 is able to collect a beacon or signal (e.g., a low-energy beacon such as Bluetooth® low-energy (BLE) beacon, a Wi-Fi signal, etc.) that is broadcasted intermittently by the communication module 106. In some examples, the signal is broadcasted by the communication module 106 at a constant rate (e.g., one broadcast per second). In other examples, a rate at which the communication module 106 broadcasts the signal is dependent upon a distance between the communication module 106 and the wireless key 104. For example, the communication module 106 may broadcast the signal at a greater rate the closer the wireless key 104 is to the vehicle 100.

The preconditioning system may have a network 115 that links the wireless key 104 with the vehicle 100. The network 115 may be a personal area network (PAN), a local area network (LAN), a wide area network (WAN), a cellular network, the Internet, or combinations thereof, that connects, couples and/or otherwise communicates between the vehicle 100 and the wireless key 104.

Further, when the wireless key 104 is within the proximity range 108, the communication module 106 is able to receive a signal (e.g., via Bluetooth® and/or BLE protocols, Wi-Fi, etc.) that is transmitted by the wireless key 104. For example, the signal received by the communication module 106 of the vehicle 100 may include user biometric data (e.g., heart rate, body temperature, etc.), position data (e.g., a GPS location), velocity data (e.g., including a speed and a direction of travel), orientation data, and/or other data of the wireless key 104. Additionally, the communication module 106 can determine a distance between the vehicle 100 and the wireless key 104. For example, the communication module 106 can determine the distance to the wireless key 104 based on a signal strength of the received signal. In some such examples, the communication module 106 utilizes a received signal strength indicator (RSSI) corresponding to the received signal to determine the distance to the wireless key 104. In other examples, the communication module 106 can determine the distance to the wireless key 104 based on GPS data received from the wireless key 104.

The vehicle 100 of the illustrated example includes a global positioning sensor (GPS) receiver 114, exterior lights 116, interior lights 118, and a climate control system 126. The GPS receiver 114 determines and/or obtains a position and/or orientation (e.g., magnetic orientation) of the vehicle 100. In the illustrated example, the exterior lights 116 includes headlamps and tail lights, and the interior lights 118 include an overhead light. The climate control system 126 includes various components for adjusting the cabin environment to a target cabin temperature. The climate control system 126 can include a heater and/or an air conditioner and an appropriate fan as part of a vehicle HVAC system. The climate control system 126 can include an HVAC component, a heated seat feature, a heated mirror feature, a heated steering wheel feature, a cooled seat feature, a cooled mirror feature, a cooled steering wheel feature, and the like.

The vehicle 100 can further include an audio system 128 so that a driver and passenger(s) can enjoy music and so forth during driving. The audio system 128 can include vehicle audio equipment such as a radio tuner, a tape player, a CD player and so forth, which obtain therefrom sound signals as sources, and process the sound signals to be output from loudspeakers. The loudspeakers are typically embedded in vehicle doors, the dash, seats, roofs, and so forth, so as to allow the loudspeakers to reproduce sound.

Each of the exterior lights 116, the interior lights 118, the climate control system 126, and the audio system 128 can be communicatively coupled to a vehicle preconditioner 124 that may send a signal to one or more of the exterior lights 116, the interior lights 118, the climate control system 126, and the audio system 128 precondition the corresponding one or more of the exterior lights 116, the interior lights 118, the climate control system 126, and the audio system 128. For example, the color and/or brightness of the exterior lights 116 and/or interior lights 118 can be preconditioned based on time of day, the perceived mood of the driver, physiological data of the driver, the location of the driver (e.g., leaving home, leaving work, leaving the gym, at a sporting event, etc.) and so forth. The climate control system 126 can be preconditioned by the vehicle preconditioner 124 based on the physiological data of the driver (e.g., elevated heart rate and/or body temperature can cause the climate control system 126 to target a first (lower) cabin temperature and lower heart rate and/or body temperature can cause the climate control system 126 to target a second (higher) cabin temperature). The audio system 128 can be adjusted by the vehicle preconditioner 124 based on time of day, the perceived mood of the driver, physiological data of the driver, the location of the driver (e.g., leaving home, leaving work, leaving the gym, etc.) and so forth.

The vehicle 100 also includes doors 120 that enable the user 102 to access and/or enter an interior of the vehicle 100. In the illustrated example, the vehicle 100 is a four-door vehicle such that the doors 120 include a front, driver-side door; a front passenger-side door; a back, driver-side door; and a back, passenger-side door. In other examples, the vehicle 100 may include more or less doors through which the user 102 may access and/or enter the interior of the vehicle 100. The vehicle 100 also includes electronic latches 122 that lock and/or unlock the doors 120. Each of the electronic latches 122 can control a respective one of the doors 120. In some examples, each of the electronic latches 122 is communicatively coupled to a sensor (e.g., a capacitive touch sensor, an infrared sensor, an angular rotation sensor, etc.) of the corresponding door 120 to detect when the user 102 is attempting to open the door 120. Each of the electronic latches 122 can be communicatively coupled to the vehicle preconditioner 124 that may send a signal to one or more of the electronic latches 122 to unlock and/or lock the corresponding one or more of the doors 120.

The vehicle preconditioner 124 also is communicatively coupled to communication module 106 and/or the GPS receiver 114 of the vehicle 100. In operation, the vehicle preconditioner 124 collects the data of the wireless key 104 (e.g., user biometric data, the location data, the velocity data, the orientation data) that is received by the communication module 106 of the vehicle 100. In some examples, the vehicle preconditioner 124 utilizes sensor fusion (e.g., executes a sensor fusion algorithm) to combine and/or reduce uncertainty associated with the data received from the wireless key 104. Additionally, the vehicle preconditioner 124 obtains the distance between the vehicle 100 and the wireless key 104 that is determined, for example, by the communication module 106 based on the RSSI of the signal received from the wireless key 104. Alternatively, the vehicle preconditioner 124 may determine the distance between the vehicle 100 and the wireless key 104 based on data collected by the vehicle 100 and/or the wireless key 104 (e.g., GPS location data).

Further, the vehicle preconditioner 124 of the illustrated example collects data associated with the vehicle 100. For example, the vehicle preconditioner 124 collects position and/or orientation (e.g., magnetic orientation) data of the vehicle 100 from the GPS receiver 114 and/or sensor(s) (e.g., sensors 304 of FIG. 3) of the vehicle 100. In some examples, the GPS receiver 114 collects position and/or orientation data of the vehicle 100 that is/are determined utilizing satellite-based GPS and/or terrestrial-based Assisted GPS.

Based on the collected data, the vehicle preconditioner 124 determines an arrival time of the user 102 at the vehicle 100. For example, the vehicle preconditioner 124 may determine a time (e.g., 5:25 P.M.) at which the user 102 is estimated to arrive at the vehicle 100 and/or an estimated time duration (e.g., 45 seconds) until the user 102 is estimated to arrive at the vehicle 100. Additionally, the vehicle preconditioner 124 preconditions the vehicle 100 (e.g., activates the external lighting 116 and/or the internal lighting 118, preconditions climate control and/or audio system, etc.) before the arrival time to enhance comfort of the user 102 upon reaching and/or during and after entering the vehicle 100.

By preconditioning the vehicle 100 based on user biometric data, location data, velocity and/or other data received from the wireless key 104, the vehicle preconditioner 124 is capable of preconditioning the vehicle 100 before a user (e.g., the user 102) arrives at the vehicle 100. For example, if the user 102 is moving quickly toward the vehicle 100, the vehicle preconditioner 124 may determine to precondition the vehicle 100 before the communication module 106 broadcasts another beacon to ensure that the vehicle 100 is preconditioned before the user 102 arrives at the vehicle 100. Alternatively, if the user 102 is moving slowly toward the vehicle 100, the vehicle preconditioner 124 may determine to wait, broadcast another beacon, and receive additional corresponding velocity data from the wireless key 104 before determining whether and/or when to precondition the vehicle 100.

Figure 2:
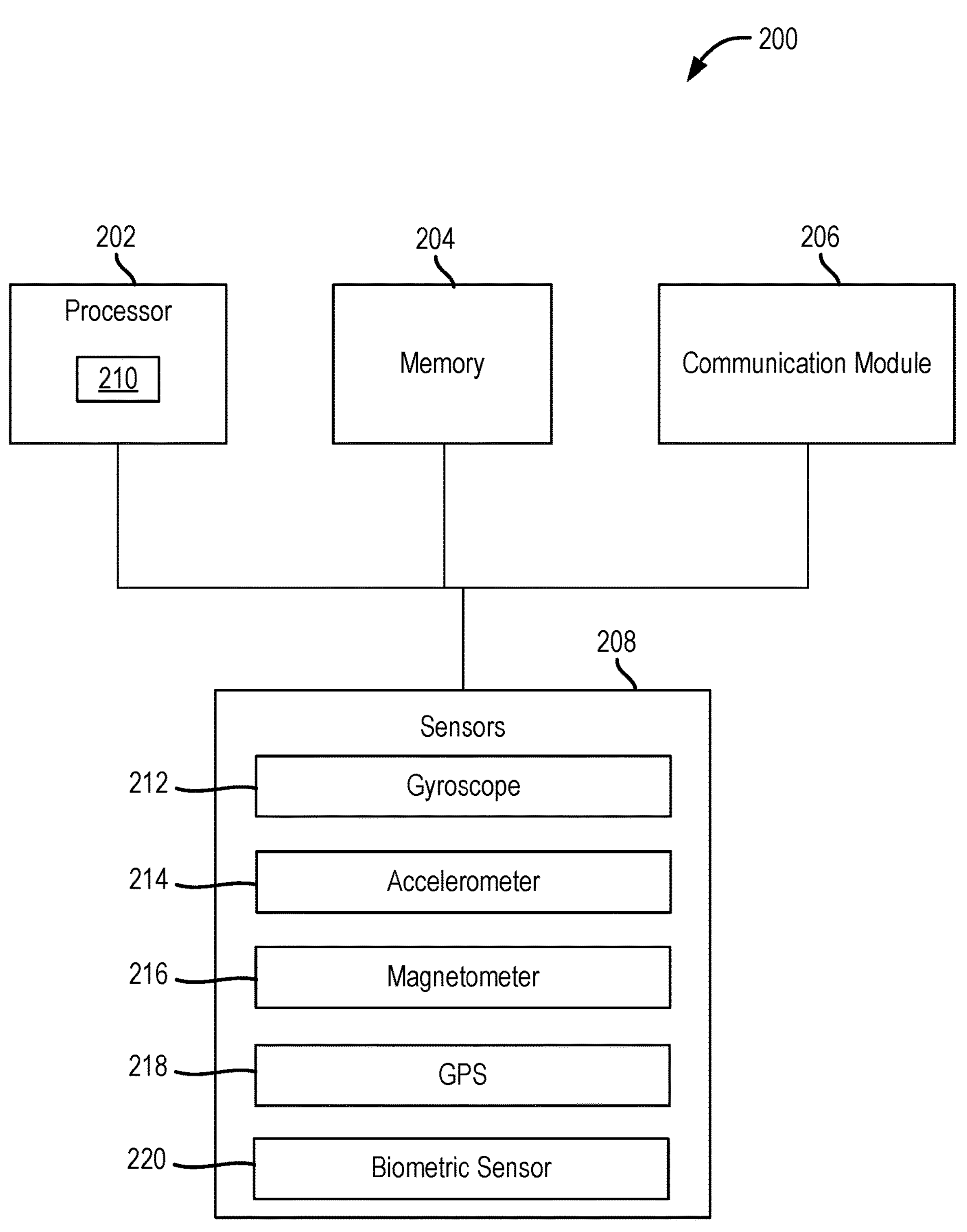
FIG. 2 is a block diagram of electronic components of the wireless key of FIG. 1 according to an aspect of the invention.

FIG. 2 is a block diagram of electronic components 200 of the wireless key 104. As illustrated in FIG. 2, the electronic components 200 include a microcontroller unit, controller, or processor 202. Further, the electronic components 200 include memory 204, a communication module 206, and sensors 208.

In the illustrated example, the processor 202 is structured to include a biometric determiner 210. The processor 202 may be any suitable processing device or set of processing devices such as, but not limited to, a microprocessor, a microcontroller-based platform, an integrated circuit, one or more field programmable gate arrays (FPGAs), and/or one or more application-specific integrated circuits (ASICs).

The memory 204 may be volatile memory (e.g., RAM including non-volatile RAM, magnetic RAM, ferroelectric RAM, etc.), non-volatile memory (e.g., disk memory, FLASH memory, EPROMs, EEPROMs, memristor-based non-volatile solid-state memory, etc.), unalterable memory (e.g., EPROMs), read-only memory, and/or high-capacity storage devices (e.g., hard drives, solid state drives, etc). In some examples, the memory 204 includes multiple kinds of memory, particularly volatile memory and non-volatile memory.

The memory 204 is a computer-readable medium on which one or more sets of instructions, such as the software for operating the methods of the present disclosure, can be embedded. The instructions may embody one or more of the methods or logic as described herein. For example, the instructions reside completely, or at least partially, within any one or more of the memory 204, the computer-readable medium, and/or within the processor 202 during execution of the instructions.

The terms "non-transitory computer-readable medium" and "computer-readable medium" include a single medium or multiple media, such as a centralized or distributed database, and/or associated caches and servers that store one or more sets of instructions. Further, the terms "non-transitory computer-readable medium" and "computer-readable medium" include any tangible medium that is capable of storing, encoding or carrying a set of instructions for execution by a processor or that cause a system to perform any one or more of the methods or operations disclosed herein. As used herein, the term "computer-readable medium" is expressly defined to include any type of computer-readable storage device and/or storage disk and to exclude propagating signals.

The communication module 206 of the electronic components 200 of the wireless key 104 is to communicatively couple to the communication module 106 of the vehicle 100. The communication module 206 can include a short-range wireless module having a wireless transducer to communicate with the communication module 106 when the vehicle 100 is within a proximity range or distance of the wireless key 104. The short-range wireless module includes software, hardware and firmware to establish a connection with the communication module 106 of the vehicle 100. In some examples, the short-range wireless module implements the Bluetooth® and/or Bluetooth® Low Energy (BLE) protocols. In some examples, the short-range wireless module implements the Wi-Fi protocols.

The sensors 208 monitor properties or characteristics related to the wireless key 104 and/or a device on which the wireless key 104 is installed. In examples in which the wireless key 104 is a key fob, the sensors 208 are located within the key fob and monitor properties or characteristics of the key fob and/or an environment in which the key fob is located. In examples in which the wireless key 104 is an application of a mobile device, the sensors are located within the mobile device and monitor properties or characteristics of the mobile device and/or an environment in which the mobile device is located. The sensors 208 can include one or more of a gyroscope 212, an accelerometer 214, a magnetometer 216, a GPS 218, and/or a biometric sensor 220. For example, the accelerometer 214 measures a velocity at which the wireless key 104 is moving. The gyroscope 212 and/or the magnetometer 216 measures a magnetic orientation of the wireless key 104 and/or a direction in which the wireless key 104 is moving. The GPS 218 can be a satellite-based GPS and/or terrestrial-based Assisted GPS utilized to determine the location, the orientation, and/or the velocity of the wireless key 104. The biometric sensor 220 can be defined to measure physiological characteristics of the user that is using the wireless key 104.

In various embodiments, the biometric sensor 220 includes a heart rate monitoring sensor. The biometric sensor 220 can include a light source and a reflected light detector. The light source and the reflected light detector can be selected for any one suitable wavelength or suitable band of wavelengths of light ranging from between infrared, through a human visible spectrum to ultraviolet wavelengths. In one example, the light source uses an infrared (IR) light. In operation, a user can place the skin of a fingertip or other body part over the light source. The light source can direct the light into the skin. The light can pass through the skin to a blood vessel such as an artery, a vein, or a capillary within the finger or the hand. A reflected portion of the light can be reflected from the blood vessel toward the reflected light detector. The light detector can output a signal corresponding to the reflected portion of the light. The signal can be transmitted to the processor 202 for processing to identify heart beats of the user and to produce an indication of a heart rate. The indication of the heart rate can be used to precondition the vehicle 100 (see FIG. 1). A user's heart rate can be measured using any suitable method and/or sensor 208 and sent to the processor 202 for processing and/or preconditioning the vehicle 100.

In various embodiments, the biometric sensor 220 includes a temperature sensor for measuring a body temperature of the user. The biometric sensor 220 can use infrared technology or similar to accurately measure skin temperature with or without direct skin contact. Once the wireless key 104 measures the driver's body temperature, it communicates this data to the vehicle's onboard computer system (e.g., the vehicle preconditioner 124) using wireless communication technology (e.g., via the network 115). The system can be designed to ensure data transmission is secure and only between the wireless key 104 and the vehicle 100 to protect the driver's privacy. Based on the data, the vehicle's climate control system (e.g., the climate control system 126) can automatically adjusts the cabin temperature to ensure the driver's comfort. If the driver's body temperature is higher than an optimal range, the system cools the cabin before the driver enters. Conversely, the system can increase the cabin's temperature if the driver's body temperature is lower than an optimal range. Despite the automated system, drivers can have the option to set preferences or manually override the automatic settings, for example via the vehicle's infotainment system. This ensures that drivers always have control over their comfort.

In operation, the biometric determiner 210 of the processor determines biometric data of the user and/or location data, velocity data, orientation data, and/or other data of the wireless key 104 based on data collected by the gyroscope 212, the accelerometer 214, the magnetometer 216, the GPS 218, the biometric sensor(s) 220, and/or any other of the sensors 208 of the wireless key 104. In some examples, the biometric determiner 210 utilizes sensor fusion (e.g., executes a sensor fusion algorithm) in which data collected from a plurality of the sensors 208 is combined to reduce uncertainty associated with the data collected from the sensors 208. Further, the communication module 206 can collect the beacon broadcasted by the communication module 106 when the wireless key 104 is located within the proximity range 108 of the vehicle 100. Additionally or alternatively, the communication module 206 uses the GPS 218 and/or a cellular communication transceiver to determine a location, a velocity, and/or an orientation of the wireless key 104. Upon collecting the beacon from the communication module 106, the communication module 206 of the wireless key 104 can generate the signal to include the biometric data, the location data, the velocity data, the orientation data, and/or other data of the wireless key 104 and transmits or sends the signal to the communication module 106 of the vehicle 100.

Figure 3:
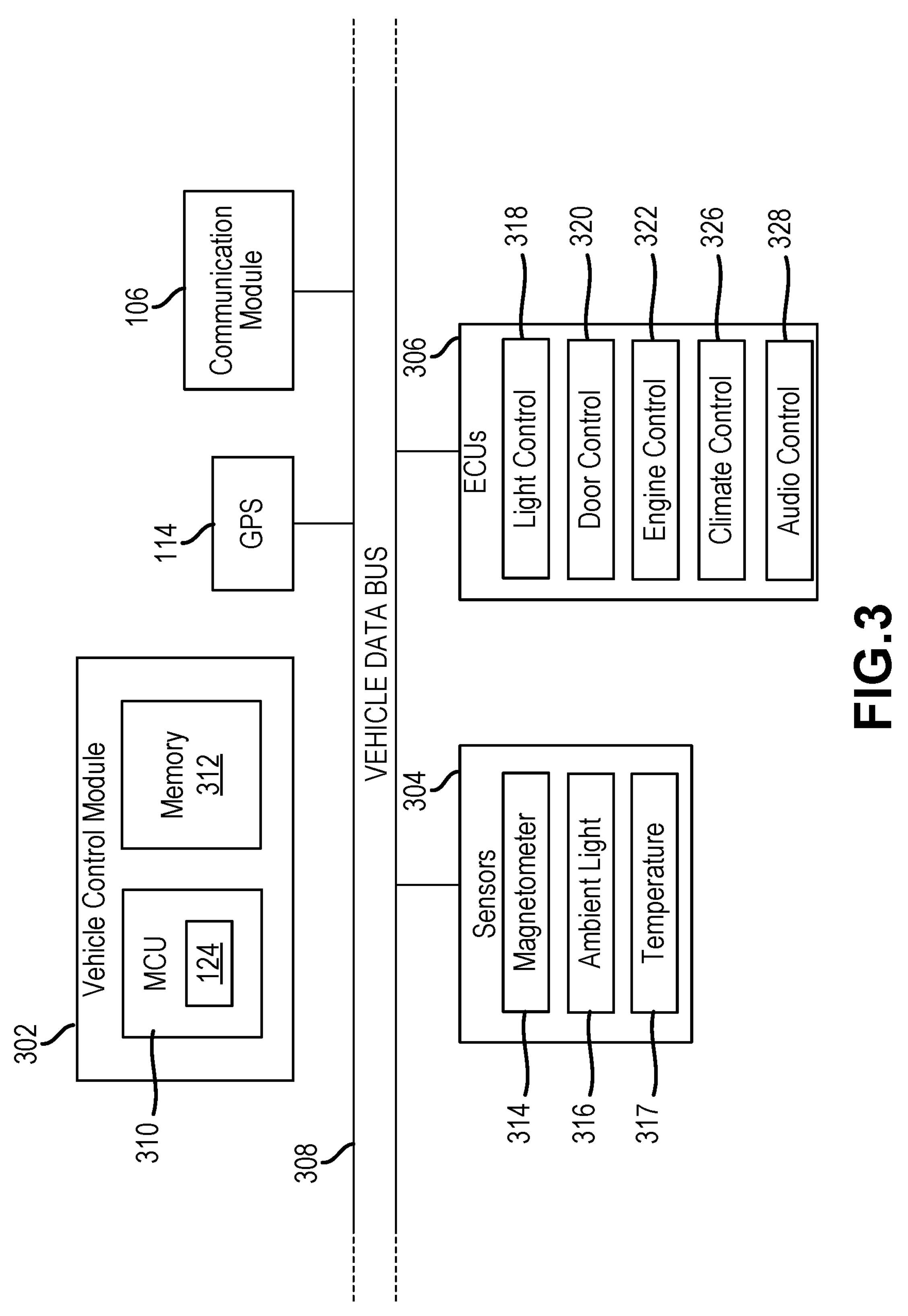
FIG. 3 is a block diagram of electronic components of the vehicle of FIG. 1 according to an aspect of the invention.

FIG. 3 is a block diagram of electronic components 300 of the vehicle 100. As illustrated in FIG. 3, the electronic components 300 include a vehicle control module 302, the GPS receiver 114, the communication module 106, sensors 304, electronic control units (ECUs) 306, and a vehicle data bus 308.

The vehicle control module 302 controls one or more subsystems throughout the vehicle 100, such as external lighting, internal lighting, power windows, power mirrors, door locks, climate control (e.g., heating-ventilation-air conditioning (HVAC)), audio control, etc. For example, the vehicle control module 302 includes circuits that drive one or more of relays (e.g., to control wiper fluid, etc.), brushed direct current (DC) motors (e.g., to control power seats, power windows, wipers, etc.), stepper motors, LEDs, etc.

The vehicle control module 302 includes a microcontroller unit, controller or processor 310 and a memory 312. In some examples, the vehicle control module 302 is structured to include the vehicle preconditioner 124. Alternatively, in some examples, the vehicle preconditioner 124 is incorporated into another electronic control unit (ECU) with its own processor 310 and memory 312. The processor 310 may be any suitable processing device or set of processing devices such as, but not limited to, a microprocessor, a microcontroller-based platform, an integrated circuit, one or more field programmable gate arrays (FPGAs), and/or one or more application-specific integrated circuits (ASICs). The memory 312 may be volatile memory (e.g., RAM including non-volatile RAM, magnetic RAM, ferroelectric RAM, etc.), non-volatile memory (e.g., disk memory, FLASH memory, EPROMs, EEPROMs, memristor-based non-volatile solid-state memory, etc.), unalterable memory (e.g., EPROMs), read-only memory, and/or high-capacity storage devices (e.g., hard drives, solid state drives, etc.). In some examples, the memory 312 includes multiple kinds of memory, particularly volatile memory and non-volatile memory.

The memory 312 is a computer-readable medium on which one or more sets of instructions, such as the software for operating the methods of the present disclosure, can be embedded. The instructions may embody one or more of the methods or logic as described herein. For example, the instructions reside completely, or at least partially, within any one or more of the memory 312, the computer-readable medium, and/or within the processor 310 during execution of the instructions.

The sensors 304 are arranged in and around the vehicle 100 to monitor properties of the vehicle 100 and/or an environment in which the vehicle 100 is located. One or more of the sensors 304 may be mounted to measure properties around an exterior of the vehicle 100. Additionally or alternatively, one or more of the sensors 304 may be mounted inside a cabin of the vehicle 100 or in a body of the vehicle 100 (e.g., an engine compartment, wheel wells, etc.) to measure properties in an interior of the vehicle 100. For example, the sensors 304 include accelerometers, odometers, tachometers, pitch and yaw sensors, wheel speed sensors, microphones, tire pressure sensors, biometric sensors, and/or sensors of any other suitable type. In the illustrated example, the sensors 304 include a magnetometer 314, an ambient light sensor 316, and a temperature sensor 317. For example, the magnetometer 314 may determine an orientation (e.g., magnetic orientation) of the vehicle 100. Additionally or alternatively, the ambient light sensor 316 may measure an amount of ambient light around the vehicle 100 to enable the vehicle control module 302 to adjust a brightness of the exterior lights 116 and/or the interior lights 118 based on the amount of ambient light. The temperature sensor 317 can measure cabin temperature and/or ambient temperature around the vehicle 100 to enable the vehicle control module to adjust and target a desired cabin interior temperature.

The ECUs 306 monitor and control the subsystems of the vehicle 100. For example, the ECUs 306 are discrete sets of electronics that include their own circuit(s) (e.g., integrated circuits, microprocessors, memory, storage, etc.) and firmware, sensors, actuators, and/or mounting hardware. The ECUs 306 communicate and exchange information via a vehicle data bus (e.g., the vehicle data bus 308). Additionally, the ECUs 306 may communicate properties (e.g., status of the ECUs 306, sensor readings, control state, error and diagnostic codes, etc.) to and/or receive requests from each other. For example, the vehicle 100 may have a plurality of the ECUs 306 that are positioned in various locations around the vehicle 100 and are communicatively coupled by the vehicle data bus 308. In the illustrated example, the ECUs 306 include a light control unit 318, a door control unit 320, an engine control unit 322, a climate control unit 326, and an audio control unit 328. For example, the light control unit 318 can operate the exterior lights 116 of the vehicle 100 and/or the interior lights 118 of the vehicle 100, the door control unit 320 operates (e.g., locks, unlocks, preconditions) of power locks of the doors 120 of the vehicle 100, the engine control unit 322 controls remote starting of an engine of the vehicle 100, the climate control unit 326 controls the HVAC system of the vehicle 100, and the audio control unit 328 controls the vehicle audio system.

The vehicle data bus 308 communicatively couples the communication module 106, the GPS receiver 114, the vehicle control module 302, the sensors 304, and the ECUs 306. In some examples, the vehicle data bus 308 includes one or more data buses. The vehicle data bus 308 may be implemented in accordance with a controller area network (CAN) bus protocol as defined by International Standards Organization (ISO) 11898-1, a Media Oriented Systems Transport (MOST) bus protocol, a CAN flexible data (CAN-FD) bus protocol (ISO 11898-7) and/a K-line bus protocol (ISO 9141 and ISO 14230-1), and/or an Ethernet™ bus protocol IEEE 802.3 (2002 onwards), etc.

Figure 4:
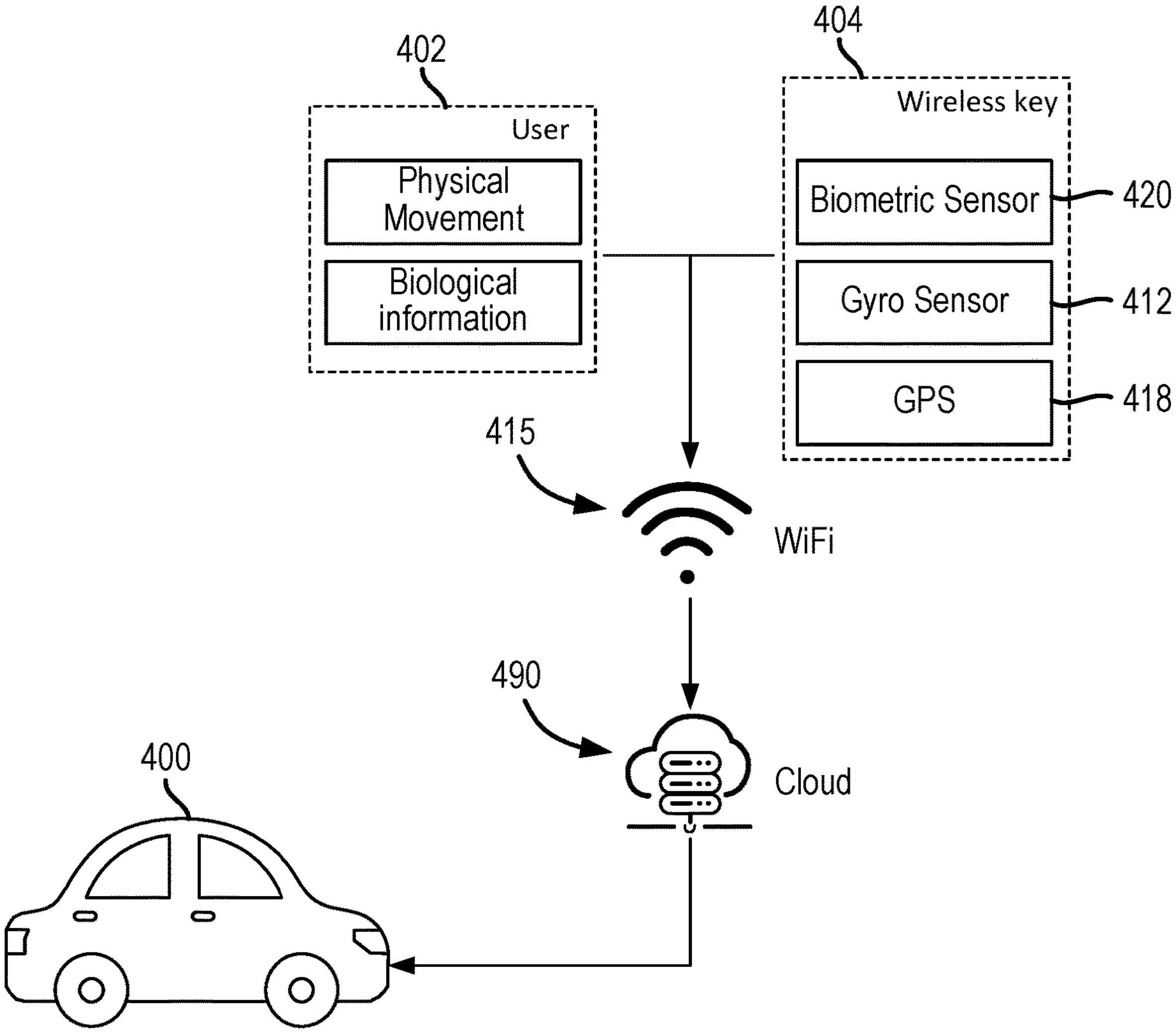
FIG. 4 illustrates an example vehicle and a block diagram of an example wireless key according to an aspect of the invention.

FIG. 4, is a schematic illustration of a system including a wireless key 404 in communication with a vehicle 400, in accordance with various aspects. The wireless key 404 can be similar to the wireless key 104 (see FIG. 1), in accordance with various aspects. The vehicle 400 can be similar to the vehicle 100 (see FIG. 1), in accordance with various aspects. The wireless key 404 can collect biometric data from a user 402, such as physical movement data or physiological information of the user, and transmit the physiological information to the vehicle 400. The wireless key 404 can communication with the vehicle 400 via a network 415. The network 415 can be similar to the network 115 (see FIG. 1), in accordance with various aspects. The wireless key 404 can communicate with the vehicle 400 directly (e.g., Bluetooth®, BTLE, LTE, 5G (or nG), etc.) or via the cloud 490 to precondition dynamic vehicle settings to enhance user experience and comfort.

Figure 5:
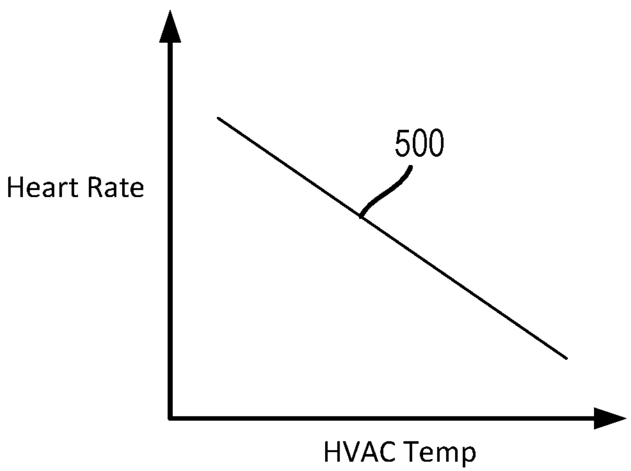
FIG. 5 is an example curve of HVAC temperature versus heart rate according to an aspect of the invention.

The wireless key 404 can include a gyro sensor 412 for motion information, a GPS sensor 418 for location information, and one or more biometric sensors 420 for heart rate information, body temperature, and external temperature and sound (via a microphone). In various embodiments, the biometric sensor 420 is a touch sensor capable of measuring the driver's body temperature, for example the biometric sensor 420 can include a touch-sensitive area on the wireless key 404 where the driver's thumb or finger is naturally placed when holding the wireless key 404. The wireless key 404 can detect the driver's heart rate and physical movement to provide a welcome light, adjust a vehicle cabin temperature, and/or perform another cabin preconditioning activity according to the driver's physical status. For example, FIG. 5 illustrates an example temperature control curve 500. The temperature control curve 500 can be saved, for example as a table, in the memory 312 (see FIG. 3) to control an interior temperature of the vehicle. As illustrated by temperature control curve 500, the vehicle preconditioner 124 can target a lower (cooler) cabin temperature (and/or adjust fan speed and/or direction) as a user's heart rate increases and conversely the vehicle preconditioner 124 can target a higher (warmer) cabin temperature (and/or adjust fan speed and/or direction) as a user's heart rate decreases. It should be understood that the same principles can be applied based on the user's body temperature (e.g., by targeting cooler temperatures in response to an elevated body temperature being detected and targeting warmer temperatures in response to a decreased body temperature being detected). Other examples include using gyration, movement, and/or other direct and indirect sensors to trigger changes in the vehicle's internal and/or external environment, such as cabin temperature, cabin light levels and lighting frequency, cabin scent, air direction, window transparency, seat position, and/or general audio settings. Therefore, the vehicle 400 can leverage an advanced vehicle cabin/cockpit experience based on psychological and/or physical status of the user 402.

Figure 6:
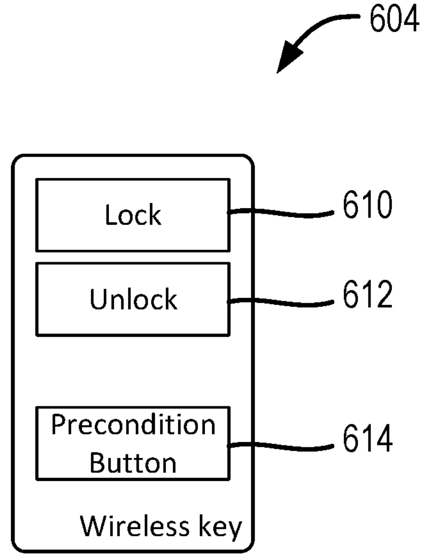
FIG. 6 illustrates an example wireless key having a precondition button according to an aspect of the invention.

FIG. 6 is an example wireless key 604 having a lock button 610, an unlock button 612, and a precondition button 614. In response to a driver pushing the lock button 610, a signal can be sent from the wireless key 604, via the network 615, to the vehicle 600 to lock a vehicle door. In response to a driver pushing the unlock button 612, a signal can be sent from the wireless key 604, via the network 615, to the vehicle 600 to unlock a vehicle door. In response to a driver pushing the precondition button 614, a signal that includes the user's current biometric data and/or location can be sent from the wireless key 604, via the network 615, to the vehicle 600 to precondition the vehicle 400 based upon the biometric data and/or location.

In various embodiments, and with combined reference to FIG. 4 and FIG. 6, the wireless key 604 is devoid of the precondition button 614 and the wireless key 604 automatically prompts the vehicle to precondition the vehicle 400 based upon the user's movement and/or location. For example, the wireless key 604 can send a signal to the vehicle 400 indicative of the user's movement (e.g., using the gyro sensor 412) and/or the user's location (e.g., using the GPS sensor 418). In this manner, the vehicle 400 can determine that the user is approaching the vehicle 400 and/or determine an arrival time of the user to activate the preconditioning of the vehicle 400. In various embodiments, the vehicle 400 determines that the user is approaching by detecting that the wireless key is within a proximity range of the vehicle 100 (e.g., see FIG. 1). In various embodiments, the vehicle 400 determines that the user is approaching based upon the GPS sensor data. The vehicle 400 can precondition itself without unlocking the vehicle's doors for safety purposes.

Figure 7:
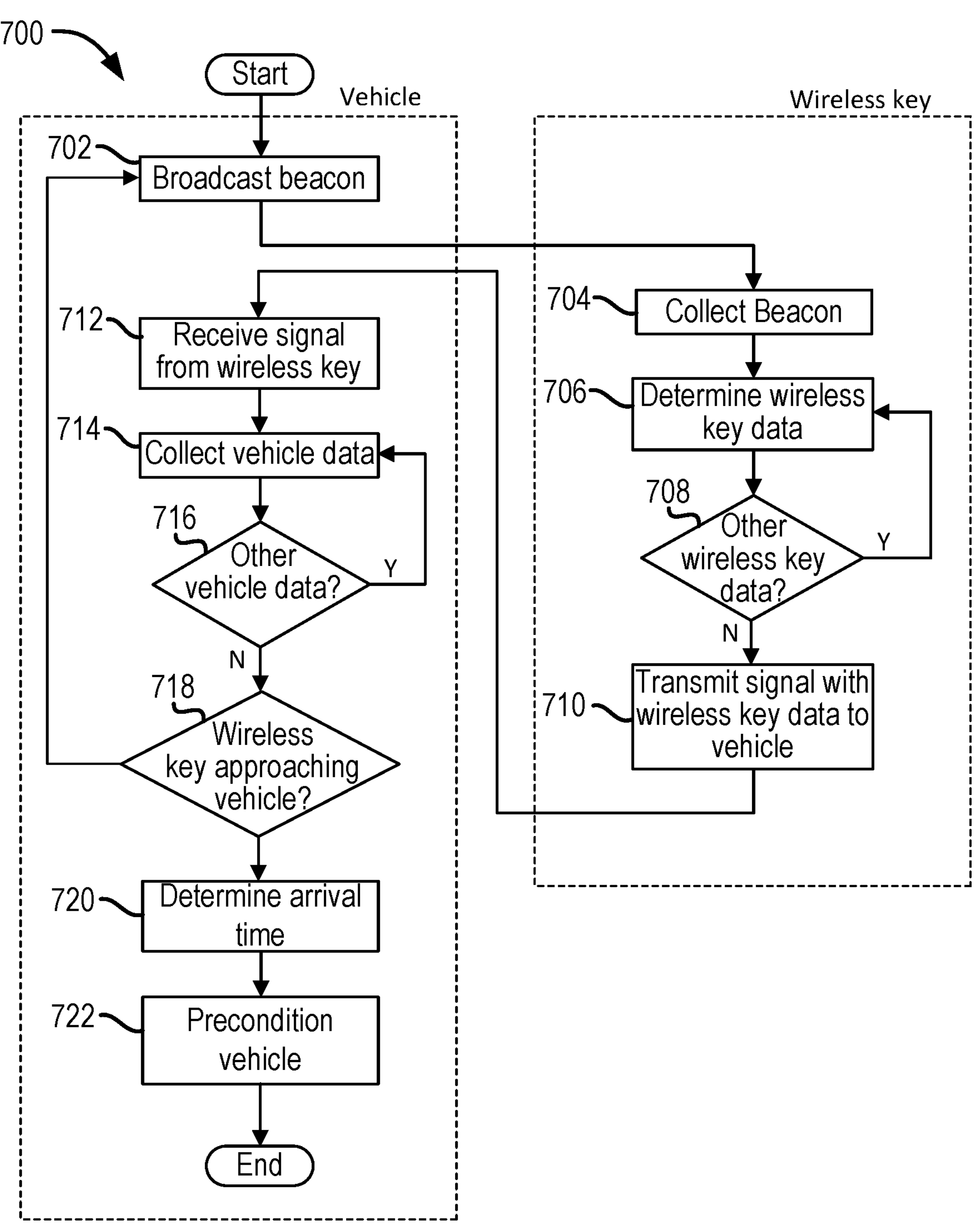
FIG. 7 is a flowchart of an example method to precondition a vehicle based on data measured by a wireless key according to an aspect of the invention.

FIG. 7 is a flowchart of an example method 700 to precondition a vehicle based on geometric data and/or location of a user of a wireless key. The flowchart of FIG. 7 is representative of machine readable instructions that are stored in memory (such as the memory 204 of FIG. 2 and/or the memory 312 of FIG. 3) and include one or more programs which, when executed by a processor (such as the processor 202 of FIG. 2 and/or the processor 310 of FIG. 3), cause the wireless key 104 to implement the example biometric determiner 210 of FIG. 2 and/or the vehicle 100 to implement the example vehicle preconditioner 124 of FIGS. 1 and 3. While the example program is described with reference to the flowchart illustrated in FIG. 7, many other methods of implementing the example biometric determiner 210 and/or the example vehicle preconditioner 124 may alternatively be used. For example, the order of execution of the blocks may be rearranged, changed, eliminated, and/or combined to perform the method 700. Further, because the method 700 is disclosed in connection with the components of FIGS. 1-3, some functions of those components will not be described in detail below.

Initially, at block 702, the communication module 106 of the vehicle 100 broadcasts the beacon. At block 704, the communication module 206 of the wireless key 104 collects the beacon. For example, the communication module 206 collects the beacon upon entering the proximity range 108 of the vehicle 100. At block 706, the biometric determiner 210 of the wireless key 104 determines wireless key data. For example, the biometric determiner 210 determines biometric data (e.g., heart rate, temperature, etc.) of the user of the wireless key 104 collected from one or more of the sensors 208 of the wireless key 104. The biometric determiner 210 can determine location data (e.g., a location of the wireless key 104) of the wireless key 104 based on data collected from one or more of the sensors 208 of the wireless key 104. The biometric determiner 210 can determine velocity data (e.g., a speed and a direction of travel) of the wireless key 104 based on data collected from one or more of the sensors 208 of the wireless key 104. At block 708, the biometric determiner 210 identifies whether there is other wireless key data to determine. If the biometric determiner 210 identifies that there is other data, blocks 706, 708 are repeated until no other wireless key data remains to be determined.

At block 710, the communication module 206 of the wireless key 104 generates the signal 112 to include the wireless key data and transmits the signal 112 to the communication module 106 of the vehicle 100. The communication module 106 of the vehicle 100 receives the signal 112 from the wireless key 104 at block 712. In various embodiments, the communication module 106 of the vehicle 100 can determine a distance between the vehicle 100 and the wireless key 104 based on the signal strength (e.g., the RSSI) of the signal 112. In various aspects, the communication module 106 of the vehicle 100 can determine a distance between the vehicle 100 and the wireless key 104 based on the GPS data received from the wireless key 104.

At block 714, the vehicle preconditioner 124 collects vehicle data from the vehicle 100. For example, the vehicle preconditioner 124 can determine the time of day and/or the surrounding brightness (e.g., daytime, dusk, dawn, nighttime, etc.) to assist with determining interior lighting settings, audio settings, etc. The vehicle preconditioner 124 may determine orientation data of the vehicle 100 based on the data collected from the GPS receiver 114 and/or one or more of the sensors 304 of the vehicle 100. At block 716, the vehicle preconditioner 124 identifies whether there is other vehicle data to be collected. If the vehicle preconditioner 124 identifies that there is other vehicle data, blocks 714, 716 are repeated until no other vehicle data remains to be determined.

At block 718, the vehicle preconditioner 124 determines whether the wireless key 104 is approaching the vehicle 100. In response to determining that the wireless key 104 is not approaching the vehicle 100, the method 700 returns to block 702. In response to determining that the wireless key 104 is approaching the vehicle 100, the method 700 proceeds to block 720. In various embodiments, at block 718, the vehicle preconditioner 124 can determine whether the wireless key 104 is approaching the vehicle 100 by determining whether the vehicle precondition button 514 has been activated.

At block 720, the vehicle preconditioner 124 determines the arrival time of the user 102 at the vehicle 100. For example, the vehicle preconditioner 124 determines the arrival time based on the velocity data of the wireless key 104. In some examples, the vehicle preconditioner 124 may compare the arrival time to a first predetermined threshold. For example, if the user 102 is moving slowly such that the user 102 will not arrive at the vehicle 100 before the first predetermined threshold (e.g., the arrival time is greater than the predetermined threshold), the method 700 returns to block 702 so that the communication module 106 of the vehicle 100 may broadcast another beacon (block 702) and receive subsequent additional wireless key data from the wireless key 104 (block 712).

At block 722, the vehicle preconditioner 124 preconditions the vehicle 100 for the user 102. For example, the vehicle preconditioner 124 may activate the exterior lights 116 and/or the interior lights 118, etc. to precondition the vehicle 100. The vehicle preconditioner 124 may adjust climate control settings of the vehicle to precondition the vehicle 100. The vehicle preconditioner 124 may adjust audio settings of the vehicle to precondition the vehicle 100. The vehicle preconditioner 124 may adjust various settings of the vehicle (e.g., cabin temperature, cabin light levels and lighting frequency, cabin scent, air direction, window transparency, seat position, and general audio settings) to precondition the vehicle 100.

In an example, the vehicle's ventilation system can be controlled by the wireless key's sensors, adjusting the direction and intensity of airflow based on the key's position relative to the vehicle and preset user preferences. For example, on a hot day, the system can maximize airflow as the user approaches the vehicle.

In an example, circadian lighting, which mimics natural light patterns, can significantly enhance the driving experience by aligning with the driver's natural body rhythms. Its implementation in the vehicle can support drivers in various ways, improving safety, comfort, and overall well-being during travel. Some use cases include:

1) Enhancing alertness during early morning and night driving. Implement circadian lighting that emits cooler, bluer light in the early morning and during nighttime driving to help increase alertness and concentration. This type of light mimics daylight and can help suppress melatonin production, making the driver feel more awake.
2) Supporting relaxation during long journeys. For long drives, especially during the day, circadian lighting can shift to warmer tones to promote relaxation without causing drowsiness. This can help reduce stress and make long periods of driving more comfortable.
3) Integration with vehicle system. Circadian lighting can be integrated with other vehicle systems, to provide a holistic environment that supports the driver's well-being. For example, lighting can be coordinated with audio or temperature controls for a comprehensive approach to comfort and alertness.
4) Personalization for drivers. Allow drivers to personalize lighting settings according to their preferences and needs. This can include adjusting the intensity of lighting transitions, ensuring that each driver can create an environment that best supports their rhythm.

Gyration and/or movement sensors can detect when the driver is approaching the vehicle even during darker hours, automatically adjusting the cabin lighting to a preset brightness and color temperature for comfort and safety. The lighting can also be programmed to adjust in frequency of alerting purposes, such as a gentle pulse to signal that the vehicle is locked or unlocked.

In an example, smart windows equipped with electrochromic technology can be controlled via the wireless key. As the user approaches, the windows can automatically adjust their tint for privacy or climate control purposes.

In an example, the wireless key can communicate with the vehicle to adjust the seat position according to the approaching user's preset preferences. This personalization can be enhanced with gyration and movement sensors that initiate the adjustment process as soon as the user is detected moving towards the vehicle.

In an example, the vehicle's audio system can automatically adjust to the user's preferred settings, such as radio station, volume, and sound equalization, based on the presence of the wireless key. Movement towards the vehicle can prompt the system to start playing the user's favorite music or news station as they enter the vehicle. Upon unlocking the vehicle with the wireless key, the vehicle's audio system can retrieve the driver's preferred music playlists and sound setting (such as bass and treble levels).

The system can use data from the vehicle's speedometer and external noise sensors (e.g., traffic noise, rain) to automatically adjust the volume of the audio output. For example, as the vehicle speeds up and exterior noise increases, the volume can automatically increase to maintain the audio's clarity without requiring manual adjustments by the driver.

Leveraging the biometric capabilities of the wireless key, such as measuring the driver's heart rate or stress level, the audio system can suggest or automatically play music that matches with the driver's mood or stress level. For example, calming music can be played if the driver's stress level is high, or more energetic music if the driver's heart rate indicates they are sleepy, to help maintain alertness.

Figure 8A:
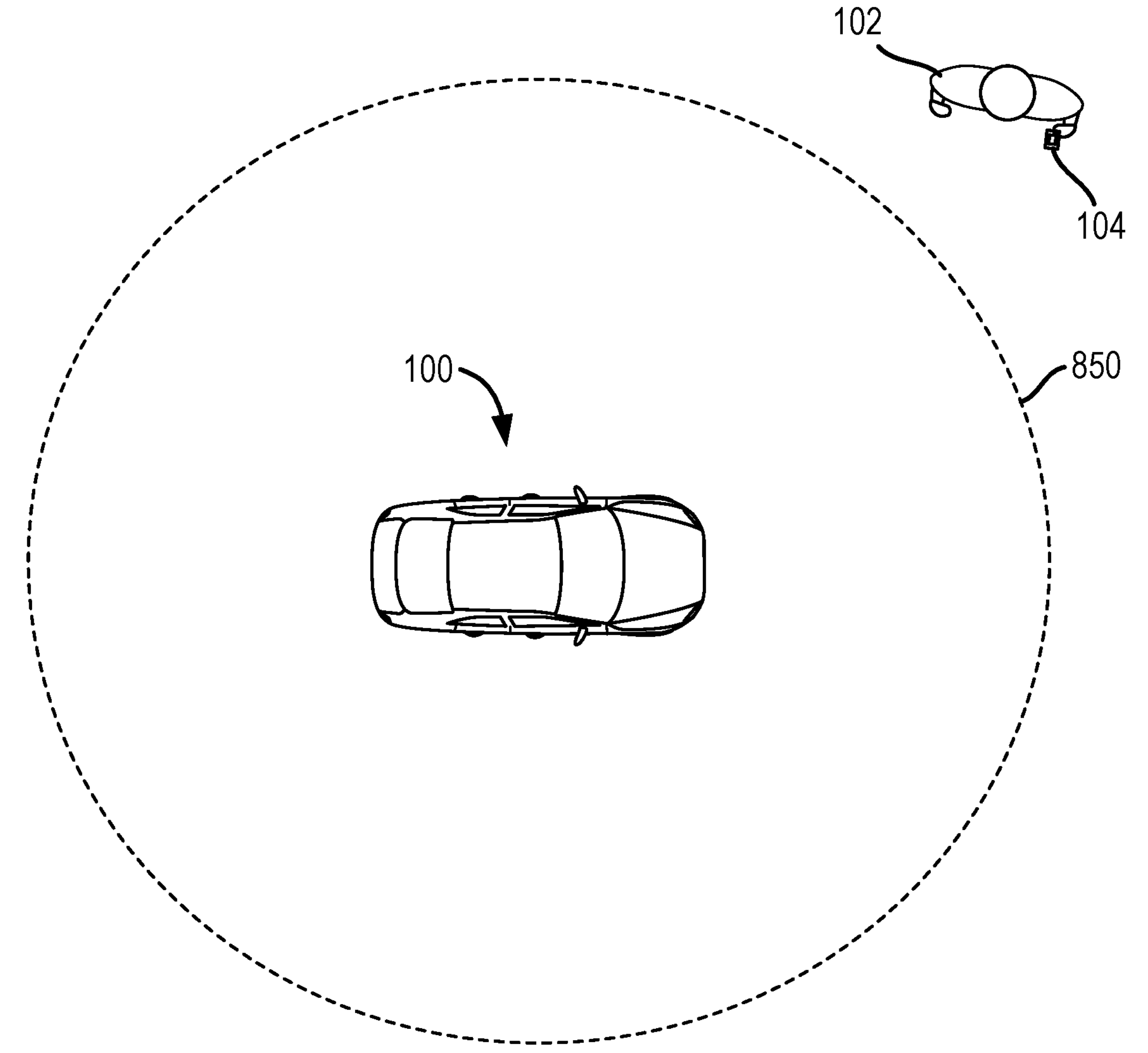
FIG. 8A illustrates a user with a wireless key located outside of a preconditioning zone of a vehicle according to an aspect of the invention.

FIG. 8A shows the user 102 with the wireless key 104 located outside of a defined precondition zone 850. The precondition zone 850 can be defined within a predetermined radius of the vehicle 100. The precondition zone 850 can be any suitable distance from the vehicle 100 depending on a number of factors, such as time of day, location of the vehicle, etc. The precondition zone 850 can be set to be a zone that, in response to the wireless key 104 entering the precondition zone 850, it is assumed that the user 102 is approaching the vehicle and/or will enter the vehicle 100 shortly, such as within one minute, five minutes, or ten minutes, in accordance with various aspects. In various embodiments, the vehicle preconditioner 124 (see FIG. 1)

can use a combination of the precondition zone 850 and the user's real-time velocity, and direction to determine whether to initiate preconditioning the vehicle 100.

Figure 8B:
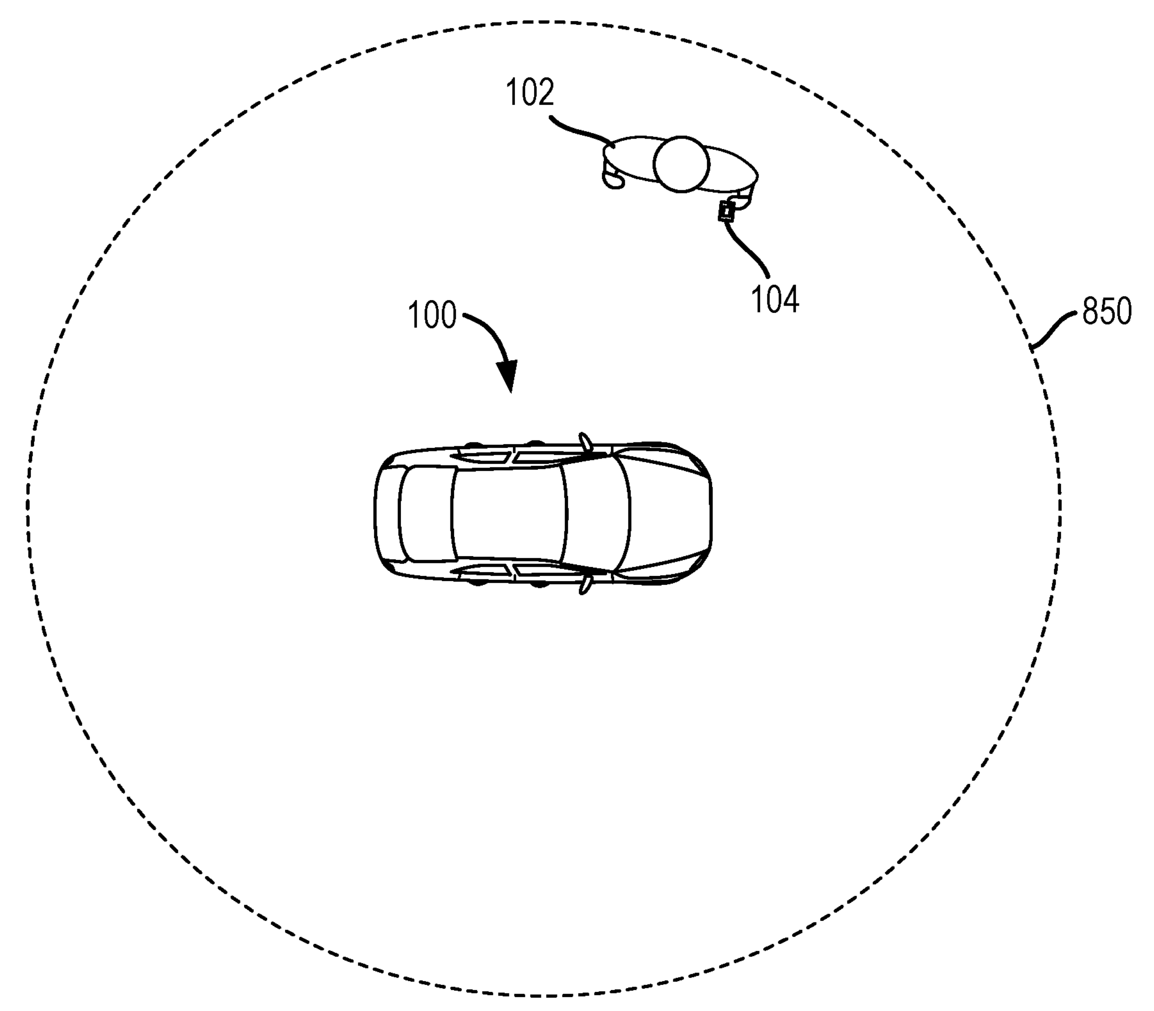
FIG. 8B illustrates a user with a wireless key located inside of a preconditioning zone of a vehicle according to an aspect of the invention.

FIG. 8B shows the user 102 with the wireless key 104 located inside the precondition zone 850. In response to detecting that the wireless key 104 has entered the precondition zone 850, the vehicle preconditioner 124 (see FIG. 1) can initiate preconditioning the vehicle 100 as described herein.

As one example of a system of the present disclosure, a user, Kate, can leave the gym after a hard workout. Using the wireless key's location, her vehicle can recognize that she is on her way out to the vehicle. The wireless key can communicate to the vehicle that Kate's body temperature is high and her heart rate is elevated. The vehicle can precondition the vehicle by activating the air conditioner so the air is already cooling the interior of the vehicle as she enters the vehicle, targeting optimal temperature for her. Kate starts to cool down thanks to the cool temperature in her vehicle. As she gets more comfortable, the wireless key can continue to signal her body temperature to the vehicle, which slowly raises the temperature from a cold blast to a lighter cool breeze. Though Kate is still able to set the temperature herself if she would like, Kate drives all the way home from the gym in comfort without the need to manually adjust the temperature in the vehicle.

In another example, when a user, John, goes to work, the preconditioner system of his vehicle can provide different atmospheres including music. The vehicle preconditioner system can provide brighter interior lighting and provide pick-me-up music. In contrast, when returning home after a long workday, the vehicle preconditioner can cause the interior lighting to be more gentle or softer (i.e., dimmer and/or more yellow) and relaxing music can play.

Exemplary embodiments of the invention have been disclosed in an illustrative style. Accordingly, the terminology employed throughout should be read in a non-limiting manner. Although minor modifications to the teachings herein will occur to those well versed in the art, it shall be understood that what is intended to be circumscribed within the scope of the patent warranted hereon are all such embodiments that reasonably fall within the scope of the advancement to the art hereby contributed, and that that scope shall not be restricted, except in light of the appended claims and their equivalents.

What is claimed is:

1. A system comprising:
- a wireless key including at least one of a biometric sensor or a GPS, the wireless key is configured to:
  - determine a location of the wireless key using the GPS and biometric data of a user of the wireless key using the biometric sensor; and
  - transmit a signal including the location of the wireless key and the biometric data of the user of the wireless key; and
- a vehicle including:
  - a communication module configured to receive the signal from the wireless key; and
  - a controller including a vehicle preconditioner module stored in memory and executable by a processor, the vehicle preconditioner module configured to:
    - determine a target value for at least one vehicle system based on both (i) the location of the wireless key and (ii) the biometric data of the user of the wireless key; and
    - precondition the vehicle by adjusting the at least one vehicle system to the target value.

2. The system of claim 1, wherein the biometric data includes at least one of a heart rate of the user and a body temperature of the user, and wherein the vehicle preconditioner module is configured to adjust the at least one vehicle system using a lookup table, and the lookup table receives as input at least one of the heart rate or the body temperature.

3. The system of claim 1, wherein the wireless key further includes a gyro sensor whereby the wireless key is configured to determine a movement of the user, and the vehicle preconditioner module is configured to determine the target value further based on movement of the user measured by the gyro sensor.

4. The system of claim 3, wherein the signal further includes movement data of the user measured by the gyro sensor, and the target value is further determined based on the movement data.

5. The system of claim 1, wherein the wireless key further includes a precondition button, the wireless key is configured to transmit the signal in response to the user engaging the precondition button.

6. The system of claim 1, wherein the preconditioning of the vehicle based upon the signal includes adjusting at least one of:
- an interior lighting of the vehicle;
- a climate control of the vehicle; or
- an audio setting of the vehicle.

7. The system of claim 6, wherein adjusting the interior lighting of the vehicle includes adjusting a color of the interior lighting.

8. The system of claim 1, wherein the vehicle is further configured to:
- determine that the wireless key is approaching the vehicle; and
- in response to determining the wireless key is approaching the vehicle, precondition the vehicle.

9. A vehicle comprising:
- a communication module configured to:
  - broadcast a beacon to prompt a wireless key to send a signal; and
  - receive the signal from the wireless key that includes biometric data of a user of the wireless key and a location of the wireless key; and
- a controller including a vehicle preconditioner module stored in memory and executable by a processor, the vehicle preconditioner module configured to:
  - determine a target value for at least one vehicle system based on both (i) the biometric data of the user and (ii) the location of the wireless key; and
  - precondition the vehicle by adjusting the at least one vehicle system to the target value.

10. The vehicle of claim 9, wherein:
- the at least one vehicle system comprises at least one of a climate control system, an interior lighting system, or an audio system; and
- the target value is at least one of a climate control setting, a lighting setting, or an audio setting.

11. The vehicle of claim 10, wherein the adjusting the interior lighting system of the vehicle includes adjusting at least one of a color or a brightness of the interior lighting based, at least in part, on a vehicle data including a time of day or an ambient brightness.

12. The vehicle of claim 9, wherein the biometric data includes at least one of a heart rate of the user and a body temperature of the user.

13. The vehicle of claim 9, wherein the vehicle preconditioner module is further configured to:

determine whether the wireless key is inside of a preconditioning zone of the vehicle; and the precondition the vehicle to the target value is performed in response to the vehicle preconditioner module determining that the wireless key is inside of the preconditioning zone of the vehicle.

14. The vehicle of claim 9, further comprising an ambient light sensor, and wherein the vehicle preconditioner module is configured to adjust a brightness of the interior lighting system based on an amount of ambient light measured by the ambient light sensor.

15. A method comprising:

receiving, via a communication module of a vehicle, a signal from a wireless key that includes a location of the wireless key and biometric data of a user of the wireless key;

determining, by a controller of the vehicle, target value for a vehicle system based on a combination of the location of the wireless key and the biometric data of the user; and preconditioning, by the vehicle system, the vehicle.

16. The method of claim 15, further comprising measuring, with a biometric sensor of the wireless key, a physiological state of the user, wherein the physiological state of the user is included in the biometric data.

17. The method of claim 16, wherein the physiological state of the user includes at least one of a heart rate of the user or a body temperature of the user.

18. The method of claim 15, wherein:

the vehicle system includes at least one of a climate control system, an interior lighting system, or an audio system; and the preconditioning the vehicle includes at least one of:

adjusting an interior lighting of the vehicle;

adjusting an interior cabin temperature of the vehicle; and adjusting an audio setting of the vehicle.

19. The method of claim 15, further comprising:

detecting, with a GPS of the wireless key, the location of the user.

20. The method of claim 15, further comprising:

determining, by the controller of the vehicle, an arrival time of the user; and the preconditioning the vehicle is further based upon the arrival time of the user.

* * * * *